(No Model.) 2 Sheets—Sheet 1.
T. POORE.
HOISTING APPARATUS FOR MINES.
No. 359,517. Patented Mar. 15, 1887.
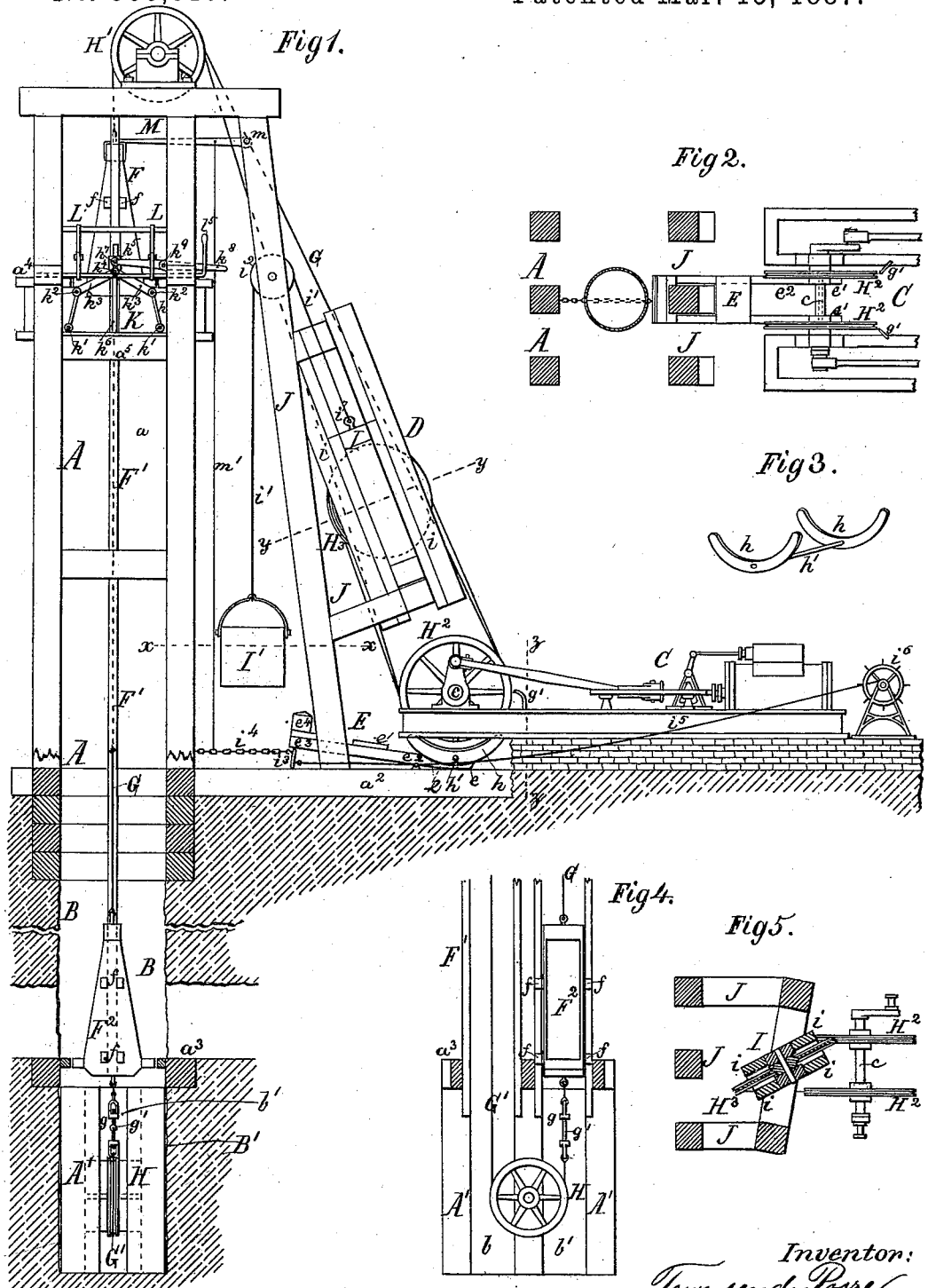
Witnesses:
J. P. Cy
Theo. Lang
Robt. L. Fenwick
Inventor:
Townsend Poore
by his Atty's
Mason Fenwick & Lawrence (No Model.) 2 Sheets—Sheet 2.

T. POORE.
HOISTING APPARATUS FOR MINES.

No. 359,517. Patented Mar. 15, 1887.

Witnesses:
J. P. Theo Lang
Robt. L. Fenwick

Inventor:
Townsend Poore
by his Attys
Mason Fenwick & Lawrence

United States Patent Office.

TOWNSEND POORE, OF SCRANTON, PENNSYLVANIA.

HOISTING APPARATUS FOR MINES.

SPECIFICATION forming part of Letters Patent No. 359,517, dated March 15, 1887.

Application filed April 19, 1886. Serial No. 199,305. (No model.)

*To all whom it may concern:*

Be it known that I, TOWNSEND POORE, a citizen of the United States, residing at Scranton, in the county of Lackawanna and State of Pennsylvania, have invented certain new and useful Improvements in Hoisting Apparatus for Deep-Mining Shafts; and I do hereby declare the following to be a full, clear, and exact description of the invention, such as will enable others skilled in the art to which it appertains to make and use the same.

My invention relates to hoisting machinery for deep-mining shafts; and it consists in certain novel constructions, arrangements, and combinations of parts in a double hoisting apparatus or plant for mine-shafts, as will be hereinafter described, and pointed out in the claims, whereby the operation of such machinery or double hoisting plant for mine-shafts is improved, greater safety and convenience secured, and such machinery or double hoisting plant is adapted for hoisting coal or other substances far above the plane on which the engines are placed, and the tail-rope is firmly held and steadied by a pit or sump sheave, and the great driving friction required is produced by two hoisting sheaves, as will be hereinafter explained.

Figure 6:
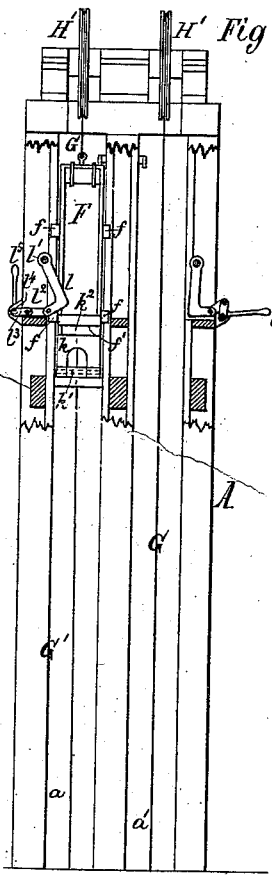
Figure 7:
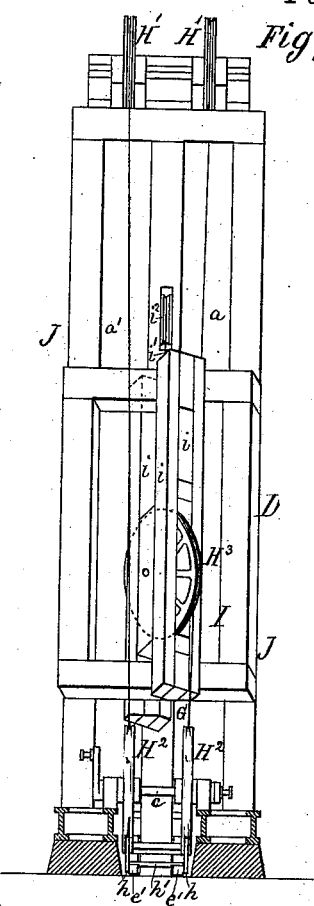
Figure 8:
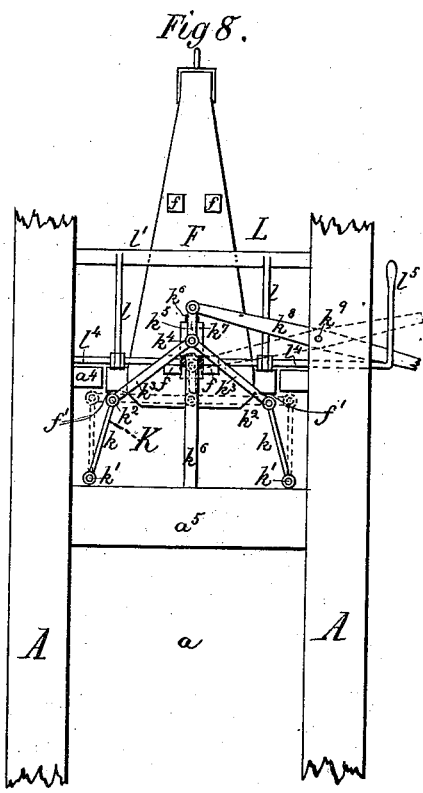
Figure 10:
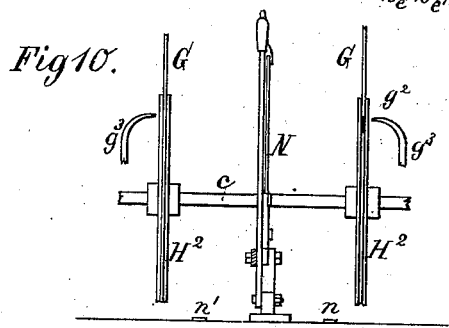
Figure 11:
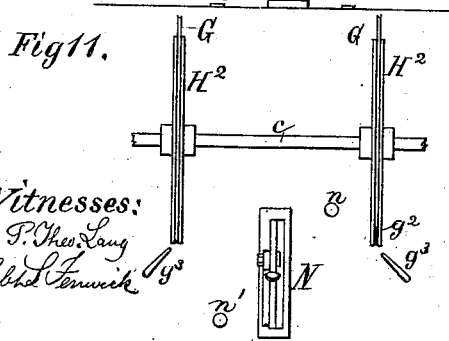
Figure 9:
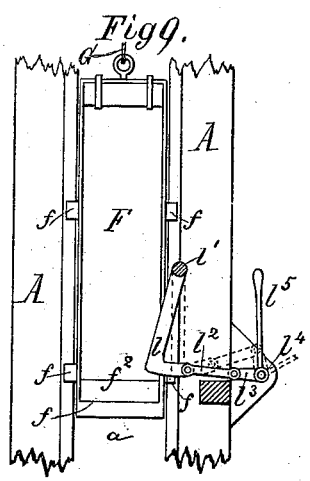

In the accompanying drawings, Figure 1 is a view, partly in elevation, partly in section, of a shaft-tower and mine-shaft, illustrating my invention. Fig. 2 is a horizontal section on the line $x\ x$ in Fig. 1, looking downward, showing a portion of the apparatus. Fig. 3 is a perspective view of the rope-clamps of the rope-brake. Fig. 4 is a detail sectional view of a frame used in a pit at the bottom of the mine-shaft, a cage with an adjustable tail-rope being shown in elevation. Fig. 5 is a cross-section on the line $y\ y$ in Fig. 1, looking downward and showing a portion of the operating-engine. Fig. 6 is a view, partly in section and partly in elevation, of the rear side of the tower and portions of the holding mechanism in relation to a cage at the upper landing. Fig. 7 is a front elevation of the tower and part of the operating-engine, the main portion of the said engine being cut away beyond the line $z\ z$ of Fig. 1. Fig. 8 is a detail side view of a portion of the tower, a cage, and the cage-holding mechanism. Fig. 9 is a view of the cage shown in Fig. 8, a portion of the tower-frame, and the upper portion of the cage-holding mechanism, as they appear standing at a right angle to Fig. 8. Fig. 10 is a diagram of the driving-sheaves, the reversing-lever of the operating-engine, the upper portions of two indicating-pointers for the rope, and two indicators for the reversing-lever; and Fig. 11 is a top view of the same.

A in the drawings represents a tower suitable for hoisting coal out of a mine-shaft. B is a mine-shaft, C a reversible steam-engine, D a tension apparatus, and E a brake.

The tower A is placed over the mine-shaft B, and is provided with two skeleton or open hoistways, $a\ a'$, within which two cages, F F², are alternately hoisted and lowered. Said cages are suspended from the two ends of an operating-rope, G, which runs over two head-sheaves, H', suitably arranged on the top of the tower and in central positions over the hoistways $a\ a'$.

The cages F F² are provided, respectively, with lugs $f$, arranged right and left of vertical guide-bars F', fastened to the inner sides of the hoistways, and continued through the whole length of the mine-shaft B, to the sides of which latter they are to be secured in a suitable manner. At the bottom of the mine-shaft, and below the lower landing-point $a^3$ of the cages, a pit, B', is formed, which contains a strong and well-fastened frame, A', of suitable construction, to which frame a sheave, H, is securely hung. Stretched around this sheave H is a tail-rope G', which connects the two cages F F² from below by means of adjusting devices $g\ g'$, such as shown, or their equivalents—an ordinary turn-buckle and two sections of a screw-rod. By turning the screw $g'$ of the adjusting device, so as to shorten or lengthen the connection, the two cages F F² are brought nearer together or moved farther apart, and thus the positions of the cages in relation to their lower and upper landings, $a^3$ $a^4$, can be very accurately adjusted. The main or hoisting rope G, to the two ends of which the cages are attached, runs up over the guide-sheaves H', down again over two driving-sheaves, H², on the main shaft $c$ of the reversible steam-engine C, and, finally, over a tightening-sheave, H³. This tightening-sheave is hung diagonally with respect to the driving-sheaves H² in a sliding frame, I, of suitable construction, in order that the rope G may pass properly upon it as said rope rises from under one of said driving-sheaves and descends under the other, as shown in Fig. 5. The said frame I slides up and down between guides $i$ of a frame, J, fastened in a suitable manner to the tower A and a portion, $a^2$, of its base. To the top of this sliding frame I, at $i'$, a rope, $i'$, is fastened, which is passed over a small grooved sheave, $i^2$, suitably hung in the auxiliary frame J, and provided with a tightening-weight, I', by which the sliding frame I is pulled up and the rope G is kept tight around the sheaves $H^2$, and is prevented from slipping on the same. Beneath the sheaves $H^2$ the brake E is arranged, so that its brake-shoes $h$ are in line with the rope G, and are united by a transverse rod, $h'$, which latter is supported upon the short lever-arm $e$ of a rocking frame, $e'$, having its fulcrum at $e^2$ and extending toward the tower, but out of range of the weight I'. Upon the end portion, $e^3$, of the longer lever-arm of the rocking frame of the brake a weight, $e^4$, is placed, which is sufficiently heavy to cause the brake-shoes $h$ to stop the rope G and the sheave $H^2$ whenever the end portion, $e^3$, is deprived of its support. This support consists of a prop, $i^3$, made trippable by means of a chain, $i^4$, stretched between the prop and the tower A.

If the main rope G should break, the sliding frame I would be pulled up and the weight I' would drop down upon the chain $i^4$, thereby pulling the prop $i^3$ away from under the brake E, causing the weight $e^4$ to fall, and thus checking the motion of the sheaves $H^2$ and rope G and clamping the latter in position.

In order to enable the engineer to quickly stop the apparatus in case of an emergency, a chain, $i^5$, is fastened to the prop $i^3$ and connected with a windlass, $i^6$, within easy reach of the engineer, who thus, with a short turn of the windlass, can trip the prop $i^3$ suddenly, and thereby effectually check the rope and engine.

The lower landings, $a^3$, of the mine-shaft are at the same level with the lowest "workings;" but the cages, on arriving there, do not settle down upon a solid support, as in some old constructions, but remain suspended by the rope G, and are held by means of fans or supports K and a stopping mechanism, L, attached to the tower and swung out below and above the discharging-landing $a^4$ of the upper cage, as shown. The fans or supports K are of ordinary construction, consisting of two transverse swinging leaves, $k$, having fulcrums $k'$ at opposite sides of their respective hoistways, their upper terminations, $k^2$, being level with the lower surfaces, $f'$, of the cages F, so that a cage resting upon the said fans is in line with the landing-point, $a^4$, as seen in Figs. 1 and 8.

In order to permit the cage to descend into the shaft, the fans or supports are swung away from the cage by means of the links $k^3$, which are pivoted to the upper portions, $k^2$, of the fans or supports, and to a pin, $k^4$, of a sliding sleeve, $k^5$, fitted loosely to an upright central rod, $k^6$, fastened suitably to a cross-beam, $a^5$, of the tower. A hand-lever, $k^8$, having fulcrum $k^9$ on the tower, is connected with the fans or supports by the pin $k^4$ of sleeve $k^5$ and a link, $k^7$, as shown, and thus, by raising the free end of the said hand-lever, the fans or supports can be moved in and out of range of the cage, and as the fulcrums $k'$ are out of range of the cage they do not interfere with its free ascent and descent. As soon as the cage arrives at the top landing the fans or supports are moved by lever $k^8$ into range with the cage, which is now stopped in its further upward progress by the engineer shutting off the steam of the engine. At this stage this cage, having a loaded car, settles back on the fans or supports, whereupon the attendant operates the stopping mechanism L in a manner to prevent the cage from rising again. This stopping mechanism L consists of two sectors, $l$, fastened to a horizontal shaft, $l'$, and suitably hung to the tower, the lower end portions of said sectors being, by means of ordinary links, $l^2$, connected with lever-arms $l^3$ on a shaft, $l^4$. The shaft $l^4$ is suitably hung to the tower, and is provided with a lever-handle, $l^5$, by means of which the sectors $l$ are swung in and out of range of the cage, the latter position being indicated by dotted lines in Fig. 9.

While the sectors $l$ remain over the platform $f^2$ of the cage, as seen in Fig. 9, the cars are removed, to wit: the upper loaded car is to be taken away and dumped and returned, and the lower empty car to be exchanged for a loaded car. As the loaded car is removed from the upper cage, and the empty car in the lower cage is replaced by a loaded car, the weight of the lower cage overbalances the weight of the upper cage, and moves the upper cage slightly above the upper landing against the sectors $l$, thereby relieving the fans or supports K, which is the signal for the attendant to open the fans or supports previous to the lowering of the upper cage with the empty car.

As the cage F is lowered from the upper platform the sectors $l$ of the stopping mechanism are swung away out of its range, and the attendant passes to the other side of the landing to repeat the operation just described with the other cage on its ascent. In case the ascent of the cage cannot be stopped immediately at the proper elevation desired, the upper portion of the cage will come in contact with a lever-arm, M, pivoted at $m$ to the tower and connected by means of a chain, $m'$, with the chain $i^4$ of the prop $i^3$, and with a suitable supplemental throttle-valve, (not shown,) and the arm M, being pushed up by the cage, will cause the chain $m'$ to pull the chain $i^4$ and draw away the prop from the brake E, and shut off the steam by means of said throttle-valve, whereby the hoisting apparatus is stopped. The supplemental throttle-valve should be placed in the most convenient position between the engines and boilers.

In order to assist the engineer in stopping the engine at the proper time, the rope G is marked at two corresponding places with paint of a distinct color, one of which marks is shown at $g^2$ in the diagrams, Figs. 10 and 11; and two pointers, $g^3$, are suitably fastened to the floor or ground, pointing to the rope on the sheaves $H^2$. When one or the other of said paint-marks $g^2$ arrives opposite one of the pointers $g^3$, the engineer stops the engine.

In order to prevent mistakes, I provide right and left of the reversing-lever N, on the floor, as seen in Figs. 10 and 11, two distinct paint or other marks $n\, n'$, the mark $n$ being near the forward end and the mark $n'$ near the rear end of the rack of the reversing-lever. When one of the paint-marks $g^2$ of the rope G appears at the right side of the reversing-lever, the right mark, $n$, indicates that the steam-engine must be started backward, and when the other paint mark, $g^2$, appears at the left side of the reversing-lever the left mark, $n'$, indicates that the steam-engine must be started forward. The cages will, in practice, be provided with the usual safety-catches, such as are to be used in compliance with law.

The advantages of my invention over the old systems are: The crank-shaft of the steam-engine can be made much shorter when provided with sheaves than when provided with the old rope-drums, and the steam-engine will occupy less room laterally and require less masonry to support it. Perfect balance of rope, cages, and cars is secured, the steam-engine having only the weight of the coal to lift, and, consequently, a smaller engine and less fuel will be required for a given duty than is with the old system. As the bottom cage, when it receives the loaded car for hoisting, is not landed, but hangs on the rope, there is no slack above it, so it is started without the jerk which occurs with some of the old systems, where there is necessarily a large amount of slack above the cage before it is started. As the upper cage is lifted from the fans or supports by running the loaded car on the lower cage, and so brought against the upper stops, where it is held, the engineer has simply to start his engine one way, which hoists the lower cage and drops the upper away from the stops above it. In the old method the engineer must first start his engine one way to "pick" the upper cage from the fans or supports, and then reverse his engine to lower the upper and hoist the lower cage. Thus it will be seen that by my system one reversal of the engine is avoided, which of course lessens the danger of mistakes and also the labor of the engineer. The hoisting-rope in my invention, being wound over the driving-sheaves in an invariable straight line, is much less exposed to wear than in the old constructions, wherein it is wound and unwound spirally on a drum.

The first cost of a hoisting-plant is greatly reduced by my invention, so much so that a plant of my improved construction, worth seven thousand dollars, would cost twenty-four thousand dollars if constructed on the old plan.

Prior to my invention, apparatus for use at collieries have employed a drum, sheaves, ropes, and a tension mechanism, arranged on nearly a horizontal plane, for moving loads; but I am not aware that this combination of parts has ever been adapted for use with towers and cages for operation in deep-mine shafts, as I have shown.

What I claim is—

1. In a double hoisting apparatus or plant for mine-shafts, the combination of an endless hoisting-rope, G, two cages, F $F^2$, two hoisting-sheaves, $H^2$, a tail-rope, G', a pit or sump sheave, H, and the tightening-sheave $H^3$, substantially as and for the purpose described.

2. The combination of the hoisting-cages F $F^2$, ropes G G', and upper stopping mechanism, L, whereby the cages F $F^2$ are prevented from incidentally moving too far from their respective landings after the upper cage is unloaded and before the engine is started, substantially as described.

3. In a hoisting apparatus for mine-shafts, the combination of the cages F $F^2$, a suitable hoisting-rope, upper stopping mechanism, L, and fans or supports K, whereby the cages are held opposite their respective landings during stoppage for loading and unloading, substantially as described.

4. In the described hoisting apparatus, the tail-rope G', having an adjusting-screw, $g$, in combination with the cages F $F^2$, hoisting-rope G, and tightening-sheave $H^3$, substantially as and for the purpose set forth.

5. In the described hoisting apparatus, the combination of the sliding frame I, having sheave $H^3$ and weight I', steam-engine C, having sheaves $H^2\, H^2$ and ropes G G', substantially as and for the purpose described.

6. The combination of the rope-tightening weight I', prop-chain $i^4$, prop $i^3$, and brake E, substantially as and for the purpose described.

7. The brake E, having brake-shoes $h\, h$ for clamping the hoisting-rope G, in combination with the prop $i^3$, driving-sheaves $H^2$, and said hoisting-rope G, substantially as and for the purpose described.

8. In the described hoisting apparatus, the combination of the hoisting-cages F $F^2$, ropes G G', lever M, chain $m'$, chain $i^4$, prop $i^3$, and brake E, substantially as and for the purpose described.

9. In the described hoisting apparatus, the combination of the windlass $i^5$, chain $i^3$, prop $i^3$, and brake E, substantially as and for the purpose described.

10. The pivoted brake E, applied beneath and in combination with the endless rope G G' and driving-sheaves $H^2\, H^2$, and with means, substantially as described, for operating said brake, and thereby stopping the hoisting apparatus in case of accident, substantially as described.

11. In the described hoisting apparatus, the ropes G G', the rope G having marks $g^2$, in combination with the sheaves $H^2$, cages F $F^2$, engine C, and pointers $g^3$, substantially as and for the purpose described.

12. In the described hoisting apparatus, the combination of the sheaves $H^2$, ropes G G', the rope G having marks $g^2$, cages F $F^2$, engine C, reversing-lever N, and marks $n\ n'$, substantially as and for the purpose described.

13. The combination of the tower A, having hoistways $a\ a'$, the tension-frame J, having tension mechanism D, a suitable hoisting-rope, and suitable driving and head sheaves, substantially as and for the purpose described.

In testimony whereof I affix my signature in presence of two witnesses.

TOWNSEND POORE.

Witnesses:
 D. DAVIS,
 WALTER M. DICKSON.